(12) United States Patent
Mahajan

(10) Patent No.: US 6,596,423 B2
(45) Date of Patent: Jul. 22, 2003

(54) METHOD FOR LOW TEMPERATURE CATALYTIC PRODUCTION OF HYDROGEN

(75) Inventor: Devinder Mahajan, South Setauket, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 214 days.

(21) Appl. No.: 09/817,468

(22) Filed: Mar. 26, 2001

(65) Prior Publication Data

US 2002/0197205 A1 Dec. 26, 2002

(51) Int. Cl.⁷ .............................. C01B 3/02; C01B 3/16; H01M 8/04
(52) U.S. Cl. ................ 429/17; 423/648.1; 423/655
(58) Field of Search ............................ 423/656, 648.1, 423/655; 429/17

(56) References Cited

U.S. PATENT DOCUMENTS

| | | | | |
|---|---|---|---|---|
| 3,490,872 A | * | 1/1970 | Fenton | 423/656 |
| 3,689,575 A | * | 9/1972 | Tarhan | 423/648.1 |
| 4,067,958 A | * | 1/1978 | Gorin | 423/648.1 |
| 4,107,076 A | * | 8/1978 | Eisenberg et al. | 423/656 |
| 4,137,298 A | | 1/1979 | Zielke et al. | |
| 4,372,833 A | | 2/1983 | King, Jr. et al. | |
| 4,801,574 A | * | 1/1989 | Brown et al. | 423/656 |
| 4,810,485 A | | 3/1989 | Marianowski et al. | |
| 4,855,267 A | * | 8/1989 | Cheng | 423/648.1 |
| 5,093,102 A | | 3/1992 | Durand et al. | |
| 6,059,995 A | | 5/2000 | Topsoe et al. | |
| 6,162,267 A | | 12/2000 | Priegnitz et al. | |

OTHER PUBLICATIONS

Cubeiro, M.I. et al., "Selective Production of Hydrogen by Partial Oxidation of Methanol Over ZnO–Supported Palladium Catalysts", Journal of Catalysts, 179, 150–162 (1998). (no month).

Mukerjee, S. et al., "Investigation of Enhanced CO Tolerance in Proton Exchange Membrane Fuel Cells by Carbon Supported PtMo Alloy Catalyst", Electromechanical and Solid–State Letters, 2(1) 12–15 (1999). (no month).

Velu, S. et al., "Oxidative steam reforming of methanol over CuZnAl(Zr)–oxide catalysts; a new and efficient method for theproduction of CO–free hydrogen for fuel cells", Chem. Commun., 2341–2342 (1999). (no month).

* cited by examiner

Primary Examiner—Wayne A. Langel
(74) Attorney, Agent, or Firm—Margaret C. Bogosian

(57) ABSTRACT

The invention provides a process for the catalytic production of a hydrogen feed by exposing a hydrogen feed to a catalyst which promotes a base-catalyzed water-gas-shift reaction in a liquid phase. The hydrogen feed can be provided by any process known in the art of making hydrogen gas. It is preferably provided by a process that can produce a hydrogen feed for use in proton exchange membrane fuel cells. The step of exposing the hydrogen feed takes place preferably from about 80° C. to about 150° C.

12 Claims, No Drawings

METHOD FOR LOW TEMPERATURE CATALYTIC PRODUCTION OF HYDROGEN

This invention was made with Government support under contract number DE-AC02-98CH10886, awarded by the U.S. Department of Energy. The Government has certain rights in the invention.

BACKGROUND OF THE INVENTION

1. Field of the Invention

This invention relates to a process for the production of hydrogen. More specifically, this invention relates to a catalytic process for the production of hydrogen at low temperatures for use in methanol or proton exchange membrane fuel cells.

2. Description of the Related Art

Fuel cells combine hydrogen and oxygen without combustion to form water and to produce direct current electric power. The process can be described as electrolysis in reverse. Fuel cells have been pursued as a source of power for transportation because of their high energy efficiency, their potential for fuel flexibility, and their extremely low emissions. Fuel cells have potential for stationary and vehicular power applications; however, the commercial viability of fuel cells for power generation in stationary and transportation applications depends upon solving a number of manufacturing, cost, and durability problems.

The most promising fuel cells for widespread transportation use are Proton Exchange Membrane (PEM) fuel cells. PEM fuel cells operate at low temperatures, produce fast transient response, and have relatively high energy density compared to other fuel cell technologies. Any fuel cell design must: (a) allow for supply of the reactants (typically hydrogen and oxygen); (b) allow for mass transport of product (water) and inert gases (nitrogen and carbon dioxide from air), and (c) provide electrodes to support catalyst, collect electrical charge, and dissipate heat.

Proton exchange membranes (PEM) fuel cells that typically utilize Pt on carbon support (Pt/C) as anode electrocatalyst operate at a lower temperature of 80° C. hold commercial promise. For methanol fuel cells, $H_2$ feed can be produced via one of the following reactions:

$$CH_3OH + H_2O \rightarrow 3H_2 + CO_2 \quad \Delta H = +49.4 \; kJ.mol^{-1} \quad (1)$$

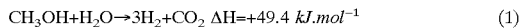

$$CH_3OH + \tfrac{1}{2}O_2 \rightarrow 2H_2 + CO_2 \quad \Delta H = -192.2 \; kJ.mol^{-1} \quad (2)$$

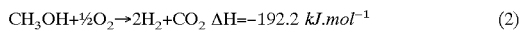

Steam reforming of methanol in Reaction 1 is carried out at temperatures greater than 280° C. over supported Cu/Zn catalysts as described by Velu, Suzuki and Osaki in Chem. Communications, No. 23, 2341–2342 (1999). Partial oxidation of methanol in Reaction 2 is also feasible and the reaction is exothermic. See Cubeiro and Fierro in Journal of Catalysts, 179, 150–162 (1998). However, a shortcoming of the above process is that the hydrogen feed produced in this manner has a high content of carbon monoxide (CO). It is known that Pt is readily poisoned by CO. Therefore, a major challenge to the commercializing of the PEM fuel cell technology is to produce $H_2$ that is essentially free of CO. Several catalysts of the type Pt—Ru/C or Pt—Mo/C, have been formulated to increase CO tolerance of the Pt catalyst as discussed in a review article by Mukerjee, et al., Electrochemical and Solid-State Letters. 2(1) 12–15 (1999). But even at a CO content of 100 ppm in the $H_2$ feed, severe catalyst poisoning is observed.

$H_2$ produced via Reaction 1 or 2 contains more than 100 ppm CO. Currently, a catalytic water-gas-shift (WGS) step as illustrated by Reaction 3 is added to remove CO to acceptable levels (<20 ppm) prior to feeding $H_2$ to the fuel cell.

$$CO_{(g)} + H_2O_{(g)} \Longleftrightarrow H_{2(g)} + CO_{2(g)} \quad \Delta H = -39.4 \; kJ.mol^{-1} \quad (3)$$

Reaction 3 is typically catalyzed by promoted iron oxides at temperatures greater than 300° C. as discussed by C. L. Thomas, in "Catalytic Processes and Proven Catalysts", Academic Press, New York, 1970. As a result, such high temperature pretreatment unnecessarily adds cost to the process. Moreover, in the gas phase, Reaction 3 is in an equilibrium that invariably leaves some CO in the product $H_2$ stream.

Accordingly, there is still a need in the art of PEM fuel cells to utilize hydrogen that is essentially free of carbon monoxide. Additionally, there is also a need to provide the hydrogen gas in a process that is conducted at low temperature by using inexpensive and simple methods.

OBJECTS OF THE INVENTION

It is, therefore, an object of the present invention to provide an improved process for the production of hydrogen gas.

It is a further object of the invention to provide a catalytic process for the production of hydrogen gas which contains reduced carbon monoxide content.

SUMMARY OF THE INVENTION

The present invention, which addresses the needs of the prior art, provides a process for the catalytic production of a hydrogen feed by exposing a hydrogen feed to a catalyst which promotes a water-gas-shift reaction in a liquid phase. The hydrogen feed can be provided by any process known in the art of making hydrogen gas. It is preferably provided by steam reforming or oxidation of methanol or by any other process that can produce a hydrogen feed for use in proton exchange membrane fuel cells. The step of exposing the hydrogen feed takes place preferably from about 80° C. to about 150° C. Formate is formed when the water-gas-shift reaction is base catalyzed.

The catalyst used in the process of the present invention can be selected from homogenous transition metal complexes. The transition metal of the complex is preferably a metal selected from Group VIII A of the periodic table, including, for example, Fe, Co, Ni, Ru, Rh, Pd, Os, Ir, Pt and Cu. The transition metal can be coupled to at least one N donor ligand such as 2,2'-dipyridyl (BIPY), sodium salt of ethylenediamine tetraacetic acid, ethylenediamine, 1,10-phenanthroline, 4,4'-dipyridyl, 1,4,8,11-tetraazacyclotetradecane (CYCLAM), N,N-Bis(2-hydroxybenzyl)ethylenediamine $H_4$ (SALEN), or mixtures thereof. The catalytic process of the invention is carried out preferably in a highly basic liquid phase such as provided by water, methanol, glyme, polyglycol, other alcohols from $C_2$ to $C_{10}$ or ethers from $C_2$ to $C_{10}$ and mixtures thereof. The liquid phase is made basic by adding bases in an amount sufficient to promote formate formation. The pH of the liquid phase is preferably greater than 8.

As a result of the process of the present invention, a new integrated system that operates at low temperatures is provided. The system consists of two steps: 1) catalyzed methanol decomposition at a temperature of less than 150° C. to produce 1 mol CO and 2 mol $H_2$ followed by, 2) fast and complete CO conversion to $CO_2$ with concomitant production of 1 mol of $H_2$ via the present invention. The present integrated system thus produces 3 mol $H_2$/mol methanol at low temperature of less than 150° C. compared to schemes for methanol fuel cell systems that are under development.

Other improvements which the present invention provides over the prior art will be identified as a result of the following description which set forth the preferred embodiments of the present invention. The description is not in any way intended to limit the scope of the present invention, but rather only to provide the working example of the present preferred embodiments. The scope of the present invention will be pointed out in the appended claims.

DETAILED DESCRIPTION OF THE INVENTION

The present invention is a process for the catalytic production of hydrogen feed at low temperatures for use in proton exchange membrane fuel cells. More specifically, the gaseous feed formed by the process of the present invention is hydrogen rich and contains very low levels of carbon monoxide.

In the process of the present invention a hydrogen feed can be formed by any process known in the art. A hydrogen feed is preferably formed by steam reforming or oxidation of methanol, methane or biomass. Hydrogen feed can also be obtained from gasification of coal and other carbonaceous materials including, without limitations, wastes of organic materials, plastics, farm, wood chips and other industrial wastes. Once formed, the hydrogen feed is exposed to a catalytic liquid phase homogeneous systems to achieve a water-gas-shift reaction for CO removal to levels less than 50 ppm. In the reaction known as water-gas-shift, water is reacted with carbon monoxide to yield hydrogen and carbon dioxide. This reaction is shown below:

$$CO_{(g)} + H_2O_{(l)} \Leftrightarrow H_{2(g)} + CO_{2(g)} \quad \Delta H = +2.8 \text{ kJ.mol}^{-1} \quad (3A)$$

This reaction operates at a low temperature of less than 150° C. CO is dissolved in the liquid phase and reacts with water on a homogenous catalytic system to produce $H_2$ and $CO_2$.

For application to PEM fuel cells, two requirements must be met. These are: 1) the reaction preferably operates at a lower temperature of from about 80° C. to about 150° C.; and 2) CO removal to less than 50 ppm is achieved with fast reaction rates. In studies reported in literature, the mechanism of homogeneously catalyzed WGS reaction has been established. For example, in base-catalyzed WGS reactions, formate ion is invoked as an intermediate as shown in Reactions 4 and 5 below:

$$CO + {}^-OH \rightarrow HCO_2{}^- \quad (4)$$

$$HCO_2{}^- + H_2O \rightarrow H_2 + CO_2 + {}^-OH \quad (5)$$

The sum of Reactions 4 and 5 is the WGS reaction (3) above. Thus, catalyzed formate decomposition is also a measure of WGS activity of a catalyst.

The advantage of the present invention is provided by the thermodynamic advantage of Reaction (3A) as opposed to Reaction (3) above. In the prior art the WGS reactions are in the gas phase. As a result of a negative enthalpy, Reaction (3) tends to go backwards to produce large amounts of CO. In the present invention, the mechanism illustrated in Reaction (3A) indicates that the reaction goes only in forward direction because in the liquid phase the homogenous catalyst reacts with CO and then picks up water to form $CO_2$. That is why by using a catalytic liquid phase homogenous system almost 100% of CO is converted to $CO_2$.

Commercially available from Aldrich Corp. and several other vendors, several metals (heterogeneous) and metal complexes (homogeneous) have been employed as catalysts useful in the present invention. Under basic conditions, at pH greater than 8, formate formation is facilitated as shown in Equation 6 below:

$$AM\text{—}OH + CO \rightarrow AM\text{—}HCO_2 \quad (6)$$

(AM=Li, Na, K, Cs)

Thus, Equation 7 is a part of the WGS catalytic cycle:

$$AM\text{—}HCO_2 + H_2O \rightarrow AM\text{—}OH + H_2 + CO_2 \quad (7)$$

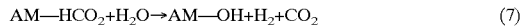

Useful sources of formate include formate salts of lithium, sodium, potassium and cesium, all readily available commercially or these materials can be conveniently synthesized in batches in the laboratory according to procedures well known in the art. Useful bases for inclusion in the liquid phase include, without limitation, hydroxides, alkoxides, bicarbonates of lithium, sodium, potassium and cesium. Alkyl amines wherein the alkyl group is from $C_1$–$C_4$ are also useful bases for the purposes of the present invention. A preferred base is potassium hydroxide.

In the present invention, commercially available transition metal complexes, based on Ru, Ni, Rh, Pt, Co, Fe, Pd, Os, Ir, Cu metals in methanol/$H_2O$ solvent mixture are employed. Useful transition metal complexes for this invention are easily commercially available and include without limitation $RuCl_3 \cdot xH_2O$, $Ru_3(CO)_{12}$, $NiCl_2 \cdot 6H_2O$, $RhCl_3 \cdot 3H_2O$, $CoCl_2$, $K_2PtCl_4$, $FeCl_2$, $Ru(CO)_5$, $Ni(CO)_4$, $Rh_6(CO)_{16}$, $Co_2(CO)_8$, $[Pt(CO)(Cl_2)]_2$ and mixtures thereof. For $RuCl_3 \cdot x\,H_2O$, x is an integer between 0 to 3.

A preferred catalyst is formed by dissolving $RuCl_3 \cdot xH_2O$ with a water-soluble ligand such as 2,2'-dipyridyl (BIPY) as manufactured by Aldrich, a commercial vendor. An organic solvent may be added such as methanol, ethanol and the like. Listed in Table 1 below are experiments that show the activity pattern of various catalysts useful in formate decomposition.

The experiments summarized in Table 1 were obtained by catalyzing 50 mmol of $KHCO_2$ in 130 ml of a solvent mixture of 5% $H_2O$/10% methanol/85% triglyme, all placed in a 0.5L AE Zipperclave batch reactor at a temperature of 120° C. and a pressure of 1.4 MPa.

TABLE 1

Decomposition of Inorganic Formates Catalyzed by Metal Complexes

| Run No. | Catalyst (mmol) | Final Gas Analysis mmol | | Time minutes | % $KHCO_2$ Decomposition |
|---|---|---|---|---|---|
| | | $H_2$ | CO | | |
| 1 | — | 1 | — | 140 | 2 |
| 2 | $RuCl_3 \cdot x\,H_2O$/— (3) | 35 | — | 80 | 70 |
| 3 | $NiCl_2 \cdot 6H_2O$/BIPY (3) (3) | 5 | — | 120 | 10 |
| 4 | $RuCl_3 \cdot x\,H_2O$/BIPY (3) (3) | 47 | — | <5 | 94 |
| 5 | $RhCl_3 \cdot 3H_2O$/BIPY (3) (3) | 50 | — | <30 | 80 |
| 6 | $CoCl_2$/BIPY (3) (3) | 2 | — | 55 | 4 |
| 7 | $K_3PtCl_4$/BIPY (3) (3) | 43 | — | <10 | 86 |
| 8 | $FeCl_2$/BIPY (3) (3) | 3 | — | 30 | 6 |
| 9 | $RuCl_3 \cdot x\,H_2O$/BIPY (3) (3) | 50 | — | <2 | 100* *(T = |

TABLE 1-continued

Decomposition of Inorganic Formates Catalyzed by Metal Complexes

| Run No. | Catalyst (mmol) | Final Gas Analysis mmol | | Time minutes | % $KHCO_2$ Decomposition |
|---|---|---|---|---|---|
| | | $H_2$ | CO | | 140° C.) |

From Table 1 above, it is apparent that the preferred catalyst system contained Ru and N-donor ligands. N-donor ligands useful in the catalyst system of the present invention include but not limited to are 2,2'-dipyridyl (BIPY), sodium salt of ethylenediamine tetraacetic acid, ethylenediamine, 1,10-phenanthroline, 4,4'-dipyridyl, 1,4,8,11-tetraazacyclotetradecane (CYCLAM), N,N-Bis(2-hydroxybenzyl)ethylenediamine $H_4$ (SALEN).

The solvent system typically employed for the homogenous catalysts useful in the present invention is an organic and/or aqueous solvent such as methanol, ethanol, other higher alcohols, glymes, polyglycol, water and mixtures thereof. $H_2$ is produced with extremely fast reaction rates. Turnover numbers as high as 8 mol $H_2$/mol Ru/min have been obtained. When the catalyst system also contains N-donor ligands turnover numbers are enhanced and can vary from about 0.1 to about 12 mol $H_2$/mol metal/min. Applying the process of the present invention to a gaseous stream of CO, $H_2O$ and $H_2$ and $CH_3OH$ results in removal of CO to very low levels. For example, levels of carbon monoxide well below 50 ppm, and preferably less than 20 ppm can be achieved.

In the examples that follow, essentially complete formate decomposition as well as CO to $CO_2$ oxidation with $H_2O$ is demonstrated. Such a system allows removal of CO to well below the 50 ppm level from a gas stream containing CO, $H_2O$, $H_2$, $CH_3OH$.

EXAMPLES

The examples below further illustrate the various features of the invention and are not intended in any way to limit the scope of the invention which is defined in the appended claims. All materials used in the examples of the present invention are readily commercially available. Gas analysis data were collected on Gow-Mac 550 gas chromatographs, operating in the thermal conductivity detector (TCD) mode, as follows: $H_2$ was analyzed on a 5 Å molecular sieve column manufactured by Linde Corp. (6 feet×⅛ inch) with $N_2$ as the carrier gas, CO was also analyzed on a 5 Å molecular sieve column manufactured by Linde Corp. (8 feet×⅛ inch) with He as the carrier gas and $CO_2$ was analyzed on Carboxen-1000 column (5 feet×⅛ inch) gas with He as the carrier gas.

Example 1

This example illustrates the catalytic activity of ruthenium trichloride for potassium formate ($KHCO_2$) decomposition. A deep red solution resulted on adding 3 mmol $RuCl_3.xH_2O$ to 130 ml of 85% triglyme/10% MeOH/5% $H_2O$ solvent mixture. The red solution and 50 mmol of $KHCO_2$ were loaded into an AE Zipperclave batch unit consisting of a 0.5 L pressure vessel, as manufactured by Autoclave Engineers (AE). The vessel was pressurized with 1.4 MPa $N_2$ and heated to 120° C. The pressure increased with time at a constant temperature of 120° C. Heating was continued for 80 minutes until a constant temperature was attained indicating that gas evolution of mainly $CO_2$ and $H_2$ from formate decomposition had ceased. On cooling the vessel, a net pressure increase of 0.22 MPa was noted.

The final gas analysis at room temperature was as follows: $H_2$=10.8%, $CO_2$=4.1%, CO less than 50 ppm. $N_2$ was calculated by difference with an accurate overall mass balance. The CO value of less than 50 ppm represents the detection limit of the gas chromatograph operating in that TCD mode. Equivalent amounts of 50 mmol each of $H_2$ and $CO_2$ were expected from the complete decomposition of 50 mmol $KHCO_2$. The measured $H_2$ concentration of 35 mmol was equivalent to 70% $KHCO_2$ decomposition. The interaction of produced $CO_2$ with dissolved base such as KOH in the solution resulted in the $CO_2$ value that was at 11 mmol lower than expected. These data established that the decomposition reaction was catalytic with respect to Ru because turnover numbers as high as 12 mol $H_2$/mol Ru/min were obtained.

Example 2

Comparative

Example 1 was repeated without adding the catalyst $RuCl_3.xH_2O$. After 140 minutes at 120° C., the gas phase was analyzed as follows: $H_2$=0.8%, $CO_2$=1.1%, CO=0.3%. 1 mmol of $H_2$ produced was equivalent to 2% $KHCO_2$ decomposition. This run established that the Ru catalyst was necessary to achieve $KHCO_2$ decomposition.

Example 3

Example 1 was repeated using as the catalyst 1 mmol $RuCl_3.xH_2O$ in the absence of $H_2O$ and the solvent mixture was adjusted to 90% triglyme/10% MeOH. The initial 1.40 MPa $N_2$ pressure stabilized in 70 minutes at 2.46 MPa. The final analysis yielded $H_2$=6.0%, $CO_2$=1.4%, CO<50 ppm. From the measured concentration of $H_2$, the $KHCO_2$ decomposition was calculated to be about 30%. The data showed that the absence of $H_2O$ retarded the decomposition reaction.

Example 4

In this example, the effect of the nature of the alkali metal associated with the formate was evaluated. The experimental conditions were the same as in Example 1 except that $KHCO_2$ was replaced with an equivalent amount of $NaHCO_2$ and only 1 mmol $RuCl_3.xH_2O$ was used. After 188 minutes at 120° C., the final gas analysis was as follows: $H_2$=9.5%, $CO_2$=4.5%, CO=0.1%. $NaHCO_2$ decomposition was calculated to be about 46%.

Example 5

In this example, the conditions were kept constant as in Example 1 except that $RuCl_3.xH_2O$ was replaced with 1 mmol $Ru_3(CO)_{12}$ which provides 3 mmol Ru equivalent. The final gas phase contained 9 mmol $H_2$, 3 mmol $CO_2$, 1 mmol CO. The produced $H_2$ corresponded to about 18% $KHCO_2$ decomposition.

Example 6

In this example, the effect of an added ligand was evaluated. Example 1 was repeated in the presence of 2,2'-dipyridyl. The initial 1.4 MPa pressure stabilized at 2.54 MPa in less than 5 minutes at 120° C. The gas analysis was as follows: $H_2$=15.4%, $CO_2$=1.7%, CO less than 50 ppm. The measured $H_2$ concentration of 47 mmol corresponded to 94% $KHCO_2$ decomposition. These data showed that the reaction was catalyzed by both Ru as well as the ligand. Sixteen turnover numbers each were obtained.

Example 7

Example 6 was repeated except that, in the solvent mixture, triglyme was replaced with polyglycol (Peg-400). The initial pressure of 1.4 MPa at room temperature increased to 2.39 MPa at 120° C. The pressure was further increased to 2.53 MPa in 20 minutes and then remained constant. The final gas analysis was as follows: $H_2=14.5\%$, $CO_2=2.9\%$, CO less than 50 ppm. The measured $H_2$ concentration of 43 mmol indicated that about 86% $KHCO_2$ decomposed.

In the above examples, formate was decomposed to hydrogen, carbon dioxide and less than 50 ppm of carbon monoxide in the presence of ruthenium metal complexes. Especially good results were obtained when the metal complexes were in the presence of 2,2'-bipyridyl. Examples 8–20 demonstrate that the decomposition of $KHCO_2$ can be catalyzed by transition metal complexes other than Ru.

Example 8

Under the conditions of Example 1, $RuCl_3 \cdot xH_2O$ was replaced with $NiCl_2 \cdot 6H_2O$. The lime green solution of the Ni complex was mixed with $KHCO_2$ and the solution was heated to 120° C. under 1.4 MPa $N_2$. At 120 minutes at 120° C., the pressure was constant at 2.25 MPa indicating that any $H_2$ production from $KHCO_2$ decomposition had ceased. Gas analysis indicated that the gas-phase $H_2$ value was constant. The final room temperature gas analysis was as follows: $H_2=1.8\%$, $CO_2=1.6\%$, CO<0.01%. These results indicated that only 8% formate decomposed was achieved.

Example 9

Example 8 was repeated with $NiCl_2 \cdot 6H_2O$ in the presence of 3 mmol of 2,2'-dipyridyl. After 105 minutes at 120° C., the final value corresponded to 10% decomposition of formate. The results of this experiment indicate that the added ligand only marginally accelerated the decomposition reaction.

Example 10

Example 9 was repeated except that $NiCl_2 \cdot 6H_2O$ was replaced with $FeCl_2$. The solution was heated to 120° C. under 1.4 MPa $N_2$. After 120 minutes at 120° C., the pressure was constant at 2.15 MPa. Gas analysis indicated that the gas-phase $H_2$ value was constant. The final room temperature gas analysis was as follows: $H_2=0.9\%$, $CO_2 0.6\%$, CO<0.01%. The measured $H_2$ yield indicated that only 6% formate decomposed.

Example 11

Example 9 was repeated except that $NiCl_2 \cdot 6H_2O$ was replaced with 3 mmol $Fe(CO)_5$. After 30 minutes at 120° C., the pressure was constant at 2.33 MPa. The final gas analysis was as follows: $H_2=3.3\%$, $CO_2=1.5\%$, CO=4.7%. The $H_2$ yield of 10 mmol corresponded to 20% $KHCO_2$ decomposition equivalent. The reaction also produced 16.5 mmol CO.

Example 12

Example 8 was repeated with 5 mmol $Fe(CO)_5$ as the catalyst. After heating at 120° C. for 129 minutes, the final pressure was constant at 2.37 MPa. The final gas analysis was as follows: $H_2=2.2\%$, $CO_2=2.1\%$, CO=2.1%. The produced $H_2$ concentration of 6 mmol corresponded to 12% $KHCO_2$ decomposition equivalent. In this run, 5 mmol CO was also produced as a gaseous product.

Example 13

In Example 8, $NiCl_2 \cdot 6H_2O$ was replaced with 3 mmol $RhCl_3 \cdot 3H_2O$ and 3 mmol of 2,2'-dipyridyl ligand was added. After 30 minutes at 120° C., the pressure stabilized at 2.43 MPa. The final gas analysis was: $H_2=13.5\%$, $CO_2=3.5\%$, CO<50 ppm. These results showed that 40 mmol $H_2$ was produced. The $H_2$ value corresponded to 80% $KHCO_2$ decomposition equivalent.

Example 14

Example 8 was repeated with 0.5 mmol $Rh_6(CO)_{16}$ which corresponded to 3 mmol Rh equivalent. After heating at 120° C. for 60 minutes, the final pressure was constant at 2.54 MPa. The final gas analysis was as follows: $H_2=15.1\%$, $CO_2=2.6\%$, CO=0.17%). The produced $H_2$ value of 41 mmol corresponded to about 82% $KHCO_2$ decomposition.

Example 15

Example 14 was repeated with $Rh_6(CO)_{16}$ in the presence of added 3 mmol of 2,2'-dipyridyl ligand. The final pressure was constant at 2.40 MPa after 110 minutes at 120° C. The final gas analysis was as follows: $H_2=12.7\%$, $CO_2=2.8\%$, CO<50 ppm. The produced $H_2$ value of 33 mmol corresponded to about 66% $KHCO_2$ decomposition.

Example 16

Example 8 was repeated with 3 mmol of $K_2PtCl_6$ as the catalyst. The pressure stabilized at 2.52 MPa. after 25 minutes at 120° C. The final gas analysis was as follows: $H_2=16.0\%$, $CO_2=3.2\%$, CO<50 ppm. The formate decomposition was calculated to be about 87% from produced $H_2$ concentration of 43.5 mmol.

Example 17

Example 16 was repeated with 3 mmol of 2,2'-dipyridyl ligand added to $K_2PtCl_6$. The final constant pressure was recorded at 2.61 MPa after 10 minutes at 120° C. The gas analysis was as follows: $H_2=16.0\%$, $CO_2=4.8\%$, CO<50 ppm. The formate decomposition was calculated to be 86% from the produced $H_2$ value of 43 mmol.

Example 18

Example 17 was repeated, however, $K_2PtCl_6$ was replaced with 3 mmol of $K_2PtCl_4$. The final pressure stabilized at 2.57 MPa after 20 minutes at 120° C. The gas analysis was as follows: $H_2=16.9\%$, $CO_2=3.1\%$, CO<50 ppm. $H_2$ was calculated to be 48 mmol that corresponded to about 96% formate decomposition.

Example 19

Example 8 was repeated after replacing $NiCl_2 \cdot 6H_2O$ with 3 mmol $CoCl_2$ in the presence of 3 mmol of 2,2'-dipyridyl ligand. The final pressure was 2.08 MPa in 55 minutes at 120° C. The gas analysis was as follows: $H_2 0.7\%$, $CO_2 0.6\%$. The $H_2$ value of 2 mmol corresponded to 4% $KHCO_2$ decomposition.

Example 20

Example 8 was repeated after replacing $NiCl_2 \cdot 6H_2O$ with 1.5 mmol $Co_2(CO)_8$ which represents 3 mmol Co equivalent and 3 mmol of added 2,2'-dipyridyl ligand. The final pressure was 2.32 MPa in 150 minutes at 120° C. From the gas analysis, based on 8 mmol $H_2$, $KHCO_2$ decomposition was calculated to be about 16%.

Examples 21–25 illustrate the applicability of metal-catalyzed liquid-phase homogeneous systems to oxidize efficiently CO to $CO_2$ in a gas stream containing a mixture of CO, $H_2O$, $CH_3OH$ and $CO_2$.

Example 21

3 mmol of $RuCl_3.xH_2O$, 3 mmol of 2,2'-dipyridyl, and 0.3 m mol of KOH were dissolved in 130 mL 50% MeOH/50% $H_2O$ solvent mixture. The resulting deep red solution was loaded in a 0.5 L pressure vessel in the AE Zipperclave batch unit. The vessel was purged twice with 50 psi CO, charged with 0.767 MPa CO and the gas phase of the vessel was analyzed to be 99.8% CO, with no $H_2$ detected. After heating the vessel, the pressure increased to 1.807 Mpa at 130° C. and remained constant. A gas sample taken at time, t=0, at 130° C. analyzed as follows: $H_2$=97.8%, CO<0.005%. The gas-phase composition remained constant after the solution was cooled to room temperature. From equivalent added CO, a total of 120 mmol $H_2$ was produced. These data showed that the reaction was catalytic both in $RuCl_3.xH_2O$ as well as 2,2'-dipyridyl. Forty turnover numbers were obtained each for Ru and the ligand.

Example 22

The final solution in Example 21 was heated to 140° C. and then further charged with CO to 3.22 MPa. The gas analysis data as a function of time at 140° C. is given below:

|  |  | Gas Analysis | | |
| --- | --- | --- | --- | --- |
| Time, min | $P_T$, MPa | % CO | % $H_2$ | % $CO_2$ |
| 0 | 3.17 | * | * | * |
| 5 | 3.22 | 13.0 | 77.5 | * |
| 16 | 2.80 | 3.4 | 87.0 | * |
| 23 | 3.09 | 1.12 | 81.9 | * |
| 35 | 3.23 | 0.22 | 83.1 | * |
| 45 | 3.33 | 0.083 | 84.0 | * |
| 90 | 3.38 | 0.014 | 84.3 | 8.4 |

\* Not measured.

The above data shows that a quick drop in the CO concentration from 13.0% to 3.4% was observed after the first 16 minutes. Thereafter, the CO dropped from 3.4% to 0.014% in 90 minutes. The ratio of $H_2$ produced to KOH was 0.71. These data illustrate that the reaction was dependent on the KOH concentration.

Example 23

This example further confirms that the CO removal from the initial gas stream is dependent on OH concentration. A dark brown solution resulted on adding 3 mmol of $RuCl_3.xH_2O$, 6 mmol of 2,2'-dipyridyl in 85% triglyme/10% MeOH/5% $H_2O$ solvent mixture. 50 mmol of KOH was then added to the dark brown solution. The base dissolved but the solution became biphasic. The biphasic solution was initially heated to 115° C. and then to 140° C. under 1.10 MPa syngas ($H_2$/CO=66%/34%). The gas analysis data is as follows:

|  |  |  | Gas Analysis | | |
| --- | --- | --- | --- | --- | --- |
| Time, min | T, ° C. | $P_T$, MPa | % CO | % $H_2$ | % $CO_2$ |
| 1 | 115 | 1.20 | 36.3 | 28.0 | * |
| 5 | 140 | 1.50 | 34.0 | 53.3 | 0.5 |
| 85 | 140 | 1.63 | 28.3 | 60.0 | 3.0 |

*Not measured.

The above data shows that of the initial amount of 64 mmol CO (in syngas), 45 mmol remained unconverted after 85 minutes at 140° C. In this reaction, 20 mmol CO and 44 mmol $H_2$ were consumed to generate products, likely methanol, in addition to $CO_2$ and $H_2$.

Example 24

Example 21 was repeated with 3 mmol of $RuCl_3.xH_2O$, 3 mmol of 2,2'-dipyridyl and 100 mmol KOH dissolved in 20% MeOH/20% $H_2O$/60% Peg-400 solvent mixture. The dark brown solution was heated to 140° C. under 1.10 MPa syngas ($H_2$/CO=66%/34%). After 3 minutes the gas analysis was as follows: $H_2$=94.7%, CO=0.14%. The analysis after 27 minutes at 140° C. was $H_2$=95.4%, CO<50 ppm. This data showed that the catalyst was: 1) effective in polyethylene glycol solvent, and 2) active in a solvent mixture containing high $H_2O$ concentration.

Example 25

Example 21 was repeated after replacing KOH with 100 mmol of $KHCO_2$. Thus, $KHCO_2$ served as a source of CO. The dark brown solution was heated to 140° C. under 0.67 MPa $H_2$. The pressure increased to 2.46 MPa at 140° C. and continued to increase to 3.06 MPa. After 11 minutes, less than 50 ppm CO was detected. The corresponding $H_2$ and $CO_2$ values were 93.8% and 4.5% respectively.

Example 26

Example 21 was repeated with reduced loading of KOH (100 mmol instead of 300 mmol) and the vessel was charged with 1.20 MPa syngas ($H_2$/CO=66%/34%) instead of 0.767 CO. On heating the solution to 140° C., the pressure increased to 2.0 MPa. The gas analysis after 60 minutes was as follows: $H_2$=96.1%, $CO_2$=0.2%, CO<50 ppm. Note that with an equivalent amount of (100 mmol) $KHCO_2$ in Example 25, the corresponding reaction time was 11 minutes. These data showed that the reaction was faster with preformed $KHCO_2$. Also, a comparison of the reaction time data in Example 21 in which 300 mmol KOH was used and a reaction time of 21 minutes showed that the reaction was also dependent on base concentration.

Thus, while we described what are the preferred embodiments of the present invention, further changes and modifications can be made by those skilled in the art without departing from the true spirit of the invention, and it is intended to include all such changes and modifications as come within the scope of the claims set forth below.

What is claimed is:

1. A process for providing a hydrogen feed, said process comprising producing said hydrogen feed from formate in a liquid phase in the presence of a formate decomposition catalyst, wherein said hydrogen feed contains less than about 50 ppm CO, and said formate decomposition catalyst is a homogenous metal complex.

2. The process of claim 1, wherein said process for producing hydrogen feed from formate is conducted in a temperate range from about 80° C. to about 150° C.

3. The process of claim 2, wherein said formate is selected from the group consisting of formates of sodium, potassium, lithium and cesium.

4. The process of claim 1, wherein said liquid phase is selected from the group consisting of water, methanol, glyme, polyglycol, other alcohols from $C_2$ to $C_{10}$ or ethers from $C_2$ to $C_{10}$, and mixtures thereof.

5. The process of claim 1, wherein said formate is generated from CO and hydroxide in a basic solution wherein the process is a water-gas-shift reaction.

6. The process of claim 5, wherein said water-gas-shift reaction comprises the steps of:

(a) producing formate from CO and water; and (b) decomposing formate in the presence of water to form said hydrogen feed and carbon dioxide.

7. The process of claim 1, wherein said homogenous metal complex is a transition metal complex having a metal selected from the group consisting of metals of Group VIII A.

8. The process of claim 7, wherein said metal is selected from the group consisting of Fe, Co, Ni, Ru, Rh, Pd, Os, Ir, Pt and Cu.

9. The process of claim 7, wherein said transition metal complex is selected from the group consisting of $RuCl_3 \cdot xH_2O$, $Ru_3(CO)_{12}$, $NiCl_2 \cdot 6H_2O$, $RhCl_3 \cdot 3H_2O$, $CoCl_2$, $K_2PtCl_4$, $FeCl_2$, $Ru(CO)_5$, $Ni(CO)_4$, $Rh_6(CO)_{16}$, $Co_2(CO)_8$, $[Pt(CO)(Cl_2)]_2$ and mixtures thereof.

10. The process of claim 9, wherein said transition metal complex is in the presence of 2,2'-dipyridyl.

11. A process for providing a hydrogen feed, said process comprising producing said hydrogen feed from formate in a liquid phase in the presence of a formate decomposition catalyst, wherein said hydrogen feed contains about 50 ppm CO, said formate decomposition catalyst is a homogenous metal complex;

providing said hydrogen feed to a proton exchange membrane fuel cell.

12. A process for providing a hydrogen feed, said process comprising producing said hydrogen feed from formate in a liquid phase in the presence of a formate decomposition catalyst, wherein said hydrogen feed contains about 50 ppm CO, said formate decomposition catalyst is in the presence of 2, 2' dipyridyl and said formate decomposition catalyst is a homogeneous metal complex.

* * * * *